United States Patent Office 3,505,079
Patented Apr. 7, 1970

3,505,079
DRY, FREE-FLOWING BAKING MIX AND
PROCESS FOR PREPARING SAME
Reginald E. Meade, Stillwater, and Sheldon I. Greenberg, Minneapolis, Minn., assignors to The Pillsbury Company, Minneapolis, Minn., a corporation of Delaware
No Drawing. Continuation-in-part of application Ser. No. 372,961, June 5, 1964. This application Oct. 12, 1967, Ser. No. 676,671
The portion of the term of the patent subsequent to May 14, 1985, has been disclaimed
Int. Cl. A21d 2/00; A23l 1/00
U.S. Cl. 99—94
28 Claims

ABSTRACT OF THE DISCLOSURE

Improved baked products and recipes for preparing baked products are obtained from a free-flowing baking premix. The baking premix comprises a multiplicity of particles, each of said particles contains sugar and flour constituents. The particles have a plurality of gas voids therein. The flour constituents in the particles have been rearranged such that the flour constituents in combination with sugar and aerated particle structure provide rapid dispersion of the starch and gluten components in an aqueous medium. Shortening may be provided in the particles as emulsified gat globules in a carefully controlled amount in respect to the flour and sugar. Cake mixes are provided from the premix by blending the premix with sugar and other conventional cake mix ingredients.

This application is a continuation-in-part of earlier filed copending application, Ser. No. 372,961, filed June 5, 1964 now U.S. Patent No. 3,383,217.

This invention relates generally to novel dry farinaceous baking compositions and to methods of production and use of the same. More particularly, it relates to novel cake mixes and to methods of producing these mixes.

Although the invention is applicable to farinaceous baking compositions generally, investigations have revealed that when applied to shortening type cake mixes, the invention provides highly unusual and unexpected results in terms of utilization of ingredients. For that reason, the invention will be illustrated herein primarily by reference to such mixes.

Cake mixes in the dry form comprise flour, sugar, shortening, emulsifier (generally incorporated into the shortening), leavening and flavors. Additives such as the water-soluble salts of carboxymethylcellulose are sometimes incorporated to improve performance characteristics of the mix. In addition, dried eggs and dehydrated nonfat milk solids may also be incorporated, or alternatively may be left to be added in the liquid state by the user of the mix when a cake is prepared therefrom.

Flour, sugar, shortening, emulsifier, leavening and flavors may be considered the basic ingredients of a cake mix to which the user may add liquids and other added ingredients during preparation. During manufacturing of a cake mix, it is sometimes desirable for the manufacturer to form a premix containing only part of the basic ingredients at certain stages of the production schedule. To the premix the balance of the basic ingredients are added to form the final cake mix. When used herein the terms "premix" and "cake mix" are used in that sense.

Cake mixes may be divided into two groups, namely shortening type mixes and non-shortening type mixes. The familiar white, yellow and chocolate layer cake mixes are representative of the first group and angel food cake mixes are representative of the latter. Shortening type cake mixes contain, as major ingredients, flour, sugar and shortening.

To the above-listed major constituents, other ingredients such as emulsifiers, starches, flavors, gums, egg solids, nonfat milk solids and leavening agents may be added. Other additives known to those skilled in the art can also be used. The amounts, types and selection of the particular components will vary depending upon the type and flavor of mix desired.

In conventional baking mix manufacture, the desired ingredients are mixed in a dry state until the desired degree of uniformity and homogeneity is obtained. Shortening-containing mixes produced in this manner comprise discrete particles of shortening embedded with or in small, discrete particles of the other components of the mix. In other words, on a microscopic scale heterogeneity is a characteristic of conventionally manufactured cake mixes. Moreover, a characteristic common of such conventionally produced mixes is a propensity toward compaction into a coherent, dense mass upon application of even small pressures. Thus, when a small sample of such a mix is squeezed between the fingers, a dense, coherent mass will result which can be broken only by application of further force. This property interferes with the flow characteristics of the mix and makes difficult the handling and packaging of the product during manufacturing.

While such conventional cake mixes have enjoyed success in the past, there is room for improvement with respect to both the characteristics of the mix and the methods for producing mixes. For example, cake mixes of the prior art, while convenient as regards time of mixing, require the addition of the prescribed liquid ingredients with, in most instances, blending at low speed during the initial stages followed by high speed mixing for times ranging up to four minutes. Any decrease in the mixing time or elimination of the blending step, without an accompanying decrease in quality, is a desirable goal.

Increased volumes of baked goods from a given weight of mix is another desirable goal. Although volumes produced by present day baking mixes are acceptable, an improvement in this property would be welcomed by both the homemaker and the manufacturer. Improvements in the volume-weight relationship of cake mixes is particularly desirable.

The quality of cakes baked from a mix decreases if the homemaker deviates from the recipe prescribed for that particular mix. Thus, homemakers who deviate unduly from the prescribed optimum conditions of cake preparation experience failures which tend to reflect upon the mix and its manufacturer. For this reason, it is extremely important that baking mixes have the widest tolerance possible to deviations from optimum conditions. Present dry mixes, particularly cake mixes, could be improved greatly in this regard.

With present day methods of mix manufacture which utilize dry blending, it is possible that insufficient blending will result and produce variations among individually packaged mixes, which variations will be reflected to the consumer as variations in the quality of a finished cake.

It is, therefore, the general object of the present invention to provide novel baking mixes having improved properties and a novel method of producing these mixes.

Another object of the invention is to provide novel baking mixes, particularly cake mixes, which will produce a finished product of given quality with less mixing during preparation than required for baking mixes of the prior art.

A further object of the invention is to provide baking mixes, particularly cake mixes, having increased tolerance to deviations from optimum prescribed directions for the preparation of goods baked from such mixes.

A still further object of the invention is to provide a cake mix capable of producing a cake having a greater volume from a given weight of miv than cake mixes of the prior art.

In accordance with the present invention there is provided a dry, aerated premix particulate portion adapted to readily disperse in an aqueous medium, said premix portion consisting essentially of a multiplicity of particles wherein said particles have an average particle density of less than 1.15 grams per cubic centimeter with each particle having a plurality of gas voids, said particles comprising on a dry weight basis 100 parts by weight flour, sugar in an amount of about 2 to 100 parts by weight and from 0 to 75 parts by weight emulsified fat; the amount of flour, sugar and shortening contained within said particles being further characterized as providing an IN value of at least 10 as ascertained by the following equation:

(I) $N = [-0.175F - 3.927E + 0.344S + 0.085FE + 0.0162FS + 0.0452ES - 30]$ wherein F, E and S are respectively representative of the weight percent of the total dry weight of the flour, emulsified fat and sugar contained in said particles. When N has a value of at least 20, baked cakes prepared from cake mixes containing the premix portion have a significant increased cake volume and recipe tolerance over those cakes wherein N has a value of 10 or less.

The distinctive features of the aerated premix particulate portion described herein provide unexpectedly superior baked products. This superiority is achieved via a combination of factors of which each plays a significant role of the resultant product. Functionality of the premix particulate portion bears a distinct relationship to the ratio of the particle constituents and the manner in which the respective constituents are provided therein. In conjunction therewith, it is essential that the particles be provided with a plurality of gas voids. The ratio of the basic premix ingredients (i.e., flour, sugar and emulsified fat) is that expressed in Equation I. Failure to comply with the conditions of Equation I will adversely effect the inherent properties of the aerated premix particulate portion. The aerated premix particulates according to the present invention have flour in which the basic constituents thereof have been rearranged (e.g., flour-starch and flour-protein agglomerates).

The unique properties of the aerated premix particles play an important role in formation of either baking batters or doughs and the baked products prepared therefrom. For example, it has been unexpectedly discovered that cake mixes containing the premix particle portion upon reconstitution thereof with an aqueous medium readily achieve a maximum cake batter viscosity without a concomitant appreciable batter viscosity reduction when exposed to continued mixing or beating. Rapid attainment of peak batter viscosity bears a relationship to the rate at which the mix ingredients are hydrated and dispersed into the reconstituting medium. In order to entrain and retain minute gas bubbles in the batter (e.g., from mechanical agitation and chemical leavening), the batter must achieve a viscosity sufficient for the entrainment and retention of minute gas bubbles.

In comparison thereto, reconstituted conventionally blended cake mixes and those mixes which contain a non-aerated, spray-dried premix of all the sugar, shortening and flour require considerably more mechanical agitation (e.g., blending) to disperse the flour constituents in the reconstituting medium. After the mix ingredients, including the flour constituents, are dispersed into the reconstituting medium and the viscosity is sufficient to entrain and retain minute gas bubbles, additional mixing (e.g., beating) is required to aerate the batter.

By employing the aerated premix particle portion, hereinbefore described, satisfactory baked cakes can be obtained from a batter preparation step consisting of shaking by hand the cake mix ingredients along with the reconstituting medium in an enclosed container. Thus, the premix particles provide a means of obviating the necessity of blending and beating the reconstituted mix with a standard household mixer.

In addition to contributing to rapid dispersion of the particle components into the reconstituting medium, the aerated particles containing a plurality of gas voids provide additional functionality during the batter preparation step. The gas contained within the particles upon dispersion of the solid ingredients into the reconstituting liquid provides an aerating effect upon the batter. Functionally, the minute gas bubbles provided in the batter by the particle gas voids function as a plurality of minute gas sites as opposed to large gas sites for subsequent gases which are incorporated therein (e.g., from mechanical blending or chemical leavening). Thus, the gas voids in the particles provide a multiplicity of functions during the reconstitution and aeration of the resultant batter.

Baked products prepared from the baking mixes containing the aerated premix portion exhibit excellent properties. The minute gas bubbles provided in the batter by the particle gas voids function as readily available and displaced nuclei to subsequently incorporated gases (e.g., from mechanical blending or chemical leavening). Consequently, the resultant baked products contain a uniform cellular structure without concomitant large gas voids therein (e.g., tunnels). The moistness of the baked products (primarily due to the uniformity in which the baking mix constituents are provided in the batter) is greatly enhanced. Similarly, the eating qualities of the baked products (e.g., tenderness) as evidenced by shear force reduction is greatly improved by utilization of the disclosed, aerated premix particulate portion. On a volume-to-mix weight basis, it has been found that the aerated premix particulate portion significantly contributes to enhanced volumes. Additional benefits resulting from the employment of the premix particulate portion include improvements in respect to tenderness, crust appearance, fragility and crumbliness, recipe tolerance and a pronounced reduction in tunneling.

Reduction of the particle density is due to incorporation of a significant amount of gas in the dry particles. This incorporated and entrapped gas is in the form of a plurality of gas voids within each of the particles.

Reduction in the particle density is also reflected in a reduction in the bulk density of the premix portion. A typical premix portion which does not contain a plurality of gas voids and consists of 100 parts by weight flour, about 30 to about 75 parts by weight sugar and 25 parts by weight shortening has an average particle density of about 1.35, a loose and packed bulk density respectively of about 0.45 and 0.60 gram per cubic centimeter. Comparatively, a premix of an identical composition and prepared in accordance with the aerating teachings herein has a particle density of about 0.85 and a loose and packed bulk density of 0.23 and 0.30 gram per cubic centimeter. Enhanced results in respect to aerated premix performance and the processing thereof are achieved when the average particle density of the premix as originally provided (e.g., directly from the spray dryer) is less than 1.0 gram per cubic centimeter and preferably less than 0.9 gram per cubic centimeter.

The aerated premix particulate portion is provided by a process which comprises the steps of:

(a) mixing 100 parts by weight flour, from about 2 to 100 parts by weight sugar, from 0 to about 75 parts by weight shortening and water in an amount sufficient to provide a visco-elastic mass being further characterized as providing a Y value of at least 10 as ascertained by the following Equation II:

(II) $Y = [0.105FW + 0.048SW + .28FE + 0.05FS + 0.15ES - 5.04F - 7.14E - 1.54S - 30]$ wherein F, W, S and E respectively represent the weight percent of flour, water, sugar and fat, said weight percents being based upon the total weight of the amount of flour, sugar, shortening and water in said visco-elastic mass; and, (b) aerating the mass with a non-toxic gas and subsequently drying the aerated mass in a particulate form, said aeration of the visco-elastic mass being sufficient to provide to the dried particulates an average particle density of less than 1.15 grams per cubic centimeter.

The mixing step must be conducted in such a manner that a homogeneous blend of all components results. When shortening is present, it is necessary that a stable emulsion be formed in order to provide a homogeneous dispersion to obviate separation of fat and water during the drying step. A conventional homogenizer operated at a homogenization pressure of about 3500 to about 4500 p.s.i. is usually sufficient to provide homogeneous dispersion of the premix ingredients. The mixing step is generally conducted at temperatures within the range of 60° F. to 140° F. Agglutination of the flour protein is obviated by maintaining the temperature below 105° F. and preferably below 95° (e.g., 60° F. to 95° F.).

To provide the aerated premix portion of the present invention, it is essential that the amount of flour, sugar and shortening be provided in the mixing step in an amount sufficient to provide a Y value of at least 10 in Equation I. At least 50 percent by weight of the total dry weight of the flour, sugar and shortening is provided by the flour (i.e., F is 50 or greater). As mentioned hereinbefore, shortening need not be present in the aerated premix portion. However, when shortening is present, the amount of sugar and flour should be adjusted accordingly to provide a Y value of at least 10. Depending upon the amount of flour and shortening, the amount of sugar broadly ranges from about 2 to about 50 weight percent of the total sugar, flour and shortening premix composition weight.

As indicated in Equation II, the amount of water employed in conjunction with the flour, sugar and shortening in providing the aerated premix portion from the visco-elastic mass is critical (i.e., weight percent of water, flour, sugar and shortening must provide a Y value of at least 10). In general, the amount of solids (e.g., flour, sugar and shortening) ranges from about 40 to about 70 weight percent of visco-elastic mass and preferably from about 50 to about 60 weight percent. When Y has a value of 20 in Equation II, a greatly improved aerated baking premix is provided by the present invention.

The flour used is preferably the flour normally used in the manufacture of the baking mix desired. Thus, flours having low protein and ash contents are preferred for cake mixes. It may be noted, however, that the present invention enables one to use for cake mixes a flour of lesser quality and cost to give the same results in terms of cake mix performance than when conventional mix manufacturing techniques and higher quality flours are used. It is believed important for most mixes that gelatinization of the starch content of the flour be substantially avoided during processing, although it must be recognized as a practical matter than gelatinization to a minor degree necessarily occurs when starch is heated and processed in the presence of water. Similarly, agglutination of the flour gluten should be avoided during processing.

Shortenings which are conventionally used in the manufacture of baking mixes are suitable for use in the present invention. They may be of animal or vegetable origin and may be either in the liquid or plastic state. In accordance with Equations I and II, the amount of shortening employed to provide the aerated premix portion ranged from 0 to about 75 parts by weight shortening for each 100 parts by weight flour. Improved bakery mixes are provided when the amount of shortening employed in providing the premix portion ranges from about 8 to about 75 parts by weight shortening for each 100 parts by weight flour. The preferred level of shortening ranges from about 20 to about 40 parts by weight emulsified shortening for each 100 parts by weight flour. As noted above, emulsifiers are commonly used as ingredients in the manufacture of conventional cake mixes. Although, as will be illustrated in examples below, the application of the present invention to cake mixes which do not utilize emulsifier systems will produce a more tolerant final cake mix and noticeable improvements in the volume of the baked cake, it is highly desirable that an emulsifier be incorporated into the ingredients which are processed in accordance with the invention. When emulsifiers are incorporated, the improvements in performance afforded by the invention are much greater. Emulsifiers are commonly incorporated into the shortening and the resulting combination referred to as "emulsified shortening." The emulsified shortening in the premix is uniformly dispersed therein as a plurality of emulsified fat globules which readily disperse into a reconstituted liquid.

In some instances herein, the term "emulsified shortening" is used. It is to be understood, however, that the emulsifier need not be carried by the shortening but may be incorporated into the visco-elastic mass as a separate ingredient.

Any edible emulsifier or combination of emulsifiers, the effectiveness of which is not destroyed during processing, may be used. Examples of common emulsifiers are glycerol esters, such as glycerol monostearate; sorbitan esters, such as sorbitan monostearate; esters of other polyhydric alcohols, such as propylene glycol monostearate; polyoxyethylene sorbitan esters, such as polyoxyethylene sorbitan monostearate; certain derivatives of glycerol esters, such as acetylated glycerol monostearate, and natural emulsifiers such as phospholipids. A system comprising polyoxyethylene sorbitan monostearate, glycerol monostearate, propylene glycol monostearate and sorbitan monostearate is preferred.

The term "sugar" as used herein includes sucrose, lactose and dextrose, all of which are commonly employed in the preparation of baking mixes, and all other equivalent substances, some of which may contain synthetic sweeteners. Pursuant to the conditions of Equations I and II, the amount of sugar employed advantageously ranges from about 14 to 100 parts by weight for each 100 parts by weight flour. Advantageously, the premix contains from about 35 to 70 parts by weight sugar for each 100 parts by weight flour with the preferred level ranging from about 40 to 50 parts by weight sugar.

Any leavening system capable of reacting during baking to release a gas and provide volume to a baked product such as a cake during baking may be used. Conventionally, sodium bicarbonate and one or more well-known leavening acids are used for this purpose. Since such mixtures, if incorporated into the visco-elastic mass produced and dried in accordance with the invention, would react at the conditions normally encountered during mixing with water and subsequently drying, it is preferable that the baking mix leavening system be blended into the mix after dehydration. It is, however, possible to dry one or more components of the leavening system with only a portion of the mix and to blend the separately dried portions, each of which contains one constituent of the leavening system, after dehydration. Any other techniques for protecting the leavening system during processing, such as applying protective coatings, can also be used.

Other conventional ingredients of baking mixes such as flavors, eggs, milk solids and hydrophilic colloids may be added to the visco-elastic mass prior to aerating and drying. It should be apparent that egg solids and milk solids which are found in some mixes may be provided by incorporating fresh eggs and fresh milk into the batter prior to the drying.

The aeration step of the visco-elastic mass prior to the drying step is accomplished by introducing into the mass a non-toxic gas. The amount of non-toxic gas introduced into and retained within the visco-elastic mass is sufficient to provide in the resultant dry premix particulate portion an average particle density of less than 1.15 grams per cubic centimeter. The amount of gas necessary to reduce the particle density will depend largely upon the means by which the gas is provided. For direct aeration with an inert gas, the incorporation of about 0.10 to about 0.80 standard cubic feet of non-toxic gas for each pound of solid (including shortening) contained in the visco-elastic mass will provide an average particle density of less than 1.15. To provide an average particle density of less than about 1.0 and an aeration rate of about 0.40 to about 0.60 cubic feet of non-toxic gas for each pound of solid contained in the visco-elastic mass is sufficient. Illustrative non-toxic gases include carbon dioxide, nitrogen and air with the latter being preferred for economic reasons. A suitable method of injecting non-toxic gases into the visco-elastic mass is disclosed in United States Patent No. 3,222,193 by Frances P. Hanrahan.

Aeration of the visco-elastic mass also be provided by solid or liquid inert gas providing substances. For example, liquid carbon dioxide or granulated solid carbon dioxide may be incorporated into the visco-elastic mass. Liquid carbon dioxide in an amount ranging from about 0.1 to about 0.8 cubic centimeter for each pound of solid will provide an average particle density of less than 1.15 grams per cubic centimeter. Similarly, conventional chemical leavening bakery agents (e.g., rapid reacting leavening acids and bases and other solid gas producing agents such as ammonium carbonate) in either the liquid or solid form can be incorporated into the visco-elastic mass to provide the necessary degree of aeration.

The drying of the aerated mass may be suitably performed by any convenient dehydration process. Suitable processes include freeze drying, vacuum drying and spray drying, of which spray drying is preferred.

If the drying step yields a product which requires comminution to result in a free-flowing product, any convenient method of grinding may be employed. One suitable method is hammer milling.

When spray drying is employed to provide the free-flowing premix particulate portion, the ingestion of gas into the visco-elastic mass results in greater expansion of the spray-dried droplets and particles, increases their surface area, lowers their density and facilitates heat transfer and thus increases the effectiveness of the heating medium. Accordingly, lower spray dryer temperature and a high solids-to-water ratio may be introduced to the spray dryer.

The shortening content of the product is present in very small globules within the dry material. The product, as noted above, is free flowing and from outward appearances is "non-greasy." As a result, it does not compact into a coherent mass when subjected to normal pressures encountered in handling.

The sugar content of the present invention is in the amorphous form because of the dissolution and drying step involved in the process. Upon storage under humid conditions, the amorphous sugar may revert to the crystalline form.

The average particle density of the aerated premix portion provided by drying of the visco-elastic mass generally ranges from about 0.7 to less than 1.15 grams per cubic centimeter. Preferably, the spray-dried premix particles have an average particle density ranging from about 0.75 to about 1.00.

Employing the aforementioned aerated premix portion there is provided by the present invention a dry, free-flowing baking mix adapted to a chemically leavened baked product containing 100 parts by weight flour, from about 15 to 250 parts by weight sugar and from about 5 to about 100 parts by weight fat, said baking mix comprising a premix particulate portion and a mix portion, said aerated premix portion consisting essentially of a multiplicity of particles wherein at least a major portion of said particles have a particle density of less than about 1.15 grams per cubic centimeter and the individual particles have a plurality of gas voids, said particles comprising on a flour, sugar and shortening weight basis at least 100 parts by weight flour, sugar in an amount ranging from about 4 to 100 parts by weight and from 0 to about 75 parts by weight emulsified fat, the amount of sugar, flour and shortening being further characterized as sufficient to provide an N value of at least 10 as ascertained by the following Equation III:

(III) $N = (-0.175F - 3.927E + 0.344S + 0.084FE + 0.016FS + 0.045ES - 30)$

Wherein F, S and E are respectively representative of the weight percent of sugar, flour and shortening contained in said particles and said mix portion comprising sugar in an amount ranging from at least 5 to about 250 parts by weight and edible fat in an amount ranging from 0 to about 50 parts by weight.

Essential baking mix ingredients not provided in the aerated premix portion are provided by the mix portion. Conventional dry blending techniques are employed to provide a blend of the premix and mix portion.

The baking mixes prepared in accordance with the present invention contain broadly from about 14 to about 250 parts by weight sugar in addition to that provided in the premix portion. This added sugar is provided in the mix portion. Although crystalline sucrose is usually employed, other sugars commonly employed in preparation of the baking mixes may be employed (e.g., lactose, dextrose, etc.). In cake mixes, the amount of sugar provided by the mix portion generally ranges from about 30 to about 80 parts by weight sugar for each 100 parts by weight flour contained in the baking mix. Distinct advantages are provided when the amount of sugar provided by the mix portion ranges from about 45 to about 70 parts by weight sugar for each 100 parts by weight flour in the premix portion.

In addition to the mix portion sugar, those essential baking mix ingredients necessary to complete the desired baking mix ingredients are included as mix portion ingredients. Illustrative mix portion ingredients include milk solids, hydrophilic colloids, salt, leavening compositions, flavoring and coloring agents, egg albumen and the like.

Typical leavening compositions include leavening bases (e.g., sodium bicarbonate) and leavening acids such as sodium acid pyrophosphate, anhydrous monocalcium phosphate, monocalcium phosphate monohydrate, adipic acid, fumaric acid, glucono delta lactone, citric acid, monosodium phosphate, tartaric acid, potassium tartrate, mixtures thereof and the like.

Although it is advantageous to include at least a major portion and preferably all of the shortening as emulsified shortening in the premix portion, the baking mixes of the present invention may contain up to about 75 parts by weight shortening in the mix portion. If the premix portion contains only a portion of the shortening deemed necessary for the baking mix (i.e., to provide the 4 to 26 percent by weight shortening), the mix portion provides the supplemental amount of shortening therefor. Thus, the amount of shortening provided by the mix portion broadly ranges from none to the total amount of shortening therein.

Chemically leavened cake mixes which contain the aforementioned aerated premix portion exhibit a greater cake volume for a given amount of mix than either conventional cakes or those produced by spray drying all of the flour, sugar and shortening cake ingredients. Although a substantial increase in the average particle density of the particulate composition is undesirable, slight changes may result during the subsequent processing thereof. Illustrative increase in the average particle density of a particulate composition may result from pneumatically conveying thereof to a high speed cake finisher which blends the mix and premix portions. Particulate compositions of a low average particle density are more tolerant to greater increase than those of higher density. In general, attrition of the particulate composition as employed in the final mix is maintained at an A value of less than about: $(1.20-X)$ $X=A$ wherein X represents the average particle density of the spray-dried particulate composition (i.e., a starting particulate composition having an average particle density of less than about 1.15). A values (i.e., increase in average particle density) for spray-dried particulates as recovered directly from the dryer having an average particle density of 1.0 and 0.75 are thus respectively $(1.20-1.0)$ $1=.2$ and $(1.20-.75)$ $.75=0.34$. Significantly better baking mix properties are obtained when the degree of attrition imparted to the particulate composition is less than: $(1.10-X)$ $X=A$.

Several inherent properties of the premix particulate portion prepared in accordance with the present invention contribute to this increased volume. An important inherent property is achieved by carefully controlling the flour, sugar and shortening composition of the individual particles (i.e., within the limitation specified in Equation I). Another inherent property contributing significantly to increased volume is the fact that the individual particles contain a plurality of non-toxic gas voids (i.e., encapsulated gas) in contradistinction to non-aerated, spray dried particles of sugar, flour and shortening. When N has a value of at least 20, the premix portion prepared in accordance with the process of the invention, baked cakes including the premix portion exhibit a significantly increased volume over that achieved when N has a value of 10.

In addition, the cake mixes of the present invention are more tolerant to deviations (e.g., from the prescribed water addition, mixing conditions or baking temperature during cake preparation) than are conventional cake mixes. This increased tolerance may be more fully described in connection with the illustrative examples set forth below. When prepared in accordance with the present invention, cake mixes may be mixed into ready-to-bake batters in much shorter times than prior art mixes.

EXAMPLE I

Spray-dried flour-sugar-shortening emulsifier premix 16.0 pounds of rearranged deodorized lard was placed in a 75-gallon heated kettle equipped with an agitator and heated to a temperature of 135° F. at which point the lard was melted. To the melted lard, there was added 5.2 pounds additional emulsifier containing 1.2 pounds of monoglycerides and 0.85 pound or sorbitan monostearate, 0.07 pound polyoxyethylene sorbitan monostearate and 1.15 pounds propylene glycol monostearate. The lard and added emulsifier were then thoroughly mixed. 81.8 pounds of water was placed in a separate mixing kettle having a capacity of 150 gallons and heated to 120° F. To the hot water there was added with thorough mixing 24.2 pounds of sucrose with continued agitation until the sucrose was dissolved therein. The melted lard and emulsifier system from the first kettle were then pumped into a second kettle under agitation, the temperature being maintained within the range of 120° F. to 125° F. This mixture was recirculated for five minutes through a Model 8M3 Oakes mixer operating at 1750 r.p.m. until the mixture was emulsified. 54.7 pounds of flour was then added and the mixture was again recirculated into the Oakes mixer for an additional fifteen minutes. The resultant emulsion was then conducted through a sparger of the type disclosed in United States Patent No. 3,222,193 by F. P. Hanrahan wherein the mixture was aerated at a rate of 0.50 standard cubic feet of air per pound of solid material contained in the emulsion. The aeration emulsion was then conducted to a horizontal, concurrent-flow Blaw-Knox Spray Dryer having a capacity of approximately 175 pounds per hour (water evaporated basis) equipped with a No. 67 orifice insert pressure nozzle using a No. 17 flat top core by Spraying Systems Inc. through a high pressure piston pump operated at a pressure of approximately between 3000 to 4000 p.s.i. In the dryer, air was admitted at a temperature with a range of 410° F. to 425° F. and had an outlet temperature ranging from 215° F. to 225° F.

Average particle density of the premix thus attained was ascertained by employing a Beckman Model No. 93001 Air Comparison Pycnometer. The average particle density of the premix portion was $0.849 \pm 0.05$ gram per cubic centimeter. Loose bulk density of the instant premix portion of 0.23 gram per cubic centimeter and the packed bulk density thereof was 0.31 gram per cubic centimeter.

To 70.65 pounds of the spray-dried premix, 19.85 pounds of sucrose, 1.5 pounds of dextrose, 3 pounds of non-fat dry milk solids, 0.85 pound of sodium chloride, 0.95 pound of sodium bicarbonate, 0.90 pound of sodium acid pyrophosphate, 0.40 pound of sodium aluminum phosphate, 1 pound of yellow color and 0.7 pound of vanilla flavoring were added and thoroughly mixed in a ribbon blender.

Several baked cakes were prepared employing the aforementioned blended premix and mix portion ingredients. The cakes were prepared by reconstituting 496 grams of the mix with 110 grams of eggs and 315 milliliters of water by blending the recipe ingredients in a standard household mixer operated at a medium speed for one minute and then beating at a high speed for two minutes. An average batter viscosity of 19,400 was ascertained by employing a Brookfield Viscometer Model No. LVF having a #4 spindle operated at 12 r.p.m. at a temperature of 23° C. Average specific gravity for the batters thus prepared was 0.58.

The cake batters thus prepared were then placed in two standard household 8-inch in diameter pans and baked for 33 minutes at 350° F. The cakes were then removed from the oven and cooled at a constant temperature of 72° F. and a relative humidity of 25% for two hours.

The average volume of the baked yellow cakes was 100. This volume number represents the sum of three measurements taken along the diameter of the cakes (i.e., at center and 2½ inches on each side thereof) while the cakes were in the pan. For each 1/16 of an inch cake height, 3.12 volume units are attributed thereto (i.e., 1/16″ × 50). The baked cakes possessed excellent symmetry, grain size, grain uniformity and crust color without tunneling or crust rings.

The cakes were then removed from the cake pans. The bottom portion of the cake measuring 0.98 inch were retained for shear press testing by removing the excess upper crust portion therefrom. From this remaining central portion of the cakes after crust removal, 4 cake pieces measuring 2.56 inches square were cut therefrom.

Each piece thus prepared was weighted and subjected to a tenderness test employing an Allo Kramer Shear Press.

The Allo Kramer Shear Press employed was a Model S2HE which included the Allo Kramer Shear Press, recorder indicator and 250-pound proving ring dynamometer. The shear cell was a standard multi-blade shear cell consisting of 10 parallel blades having a thickness of 0.125 inch, a 4.44-inch length and 2.74-inch width spaced 0.126 inch apart. The blades were adapted to pass through a 2½-inch cube holding cell having ten 0.126-inch slits.

The recorder indicator was set at 50 percent full scale value. Extrusion time interval employed was 20 seconds for a full down stroke. Tenderness scores were determined by the following calculations:

$$\text{Tenderness score} = \frac{\text{pounds force}}{\text{sample weight in grams}}$$

$$\times 453.6 \text{ grams/pound} = \frac{\text{grams force}}{\text{grams of sample}}$$

The average tenderness score for the baked cakes thus prepared was 586 grams force per gram product. Standard deviation for the testing procedure was ±18 grams. A lower tenderness score is indicative of a more tender cake.

mix containing aerated particles was 94 (i.e., about 19 volume units per 100 grams of mix). The mix containing the non-aerated premix particles was 86 (i.e., about 17.4 volume units per 100 grams of mix).

EXAMPLE II

Yellow cake mixes containing the aerated and non-aerated premix particles according to Example I were prepared. The amount of water and premix cake ingredients employed in providing the premix particles and additional cake ingredients added thereto to provide the final yellow cake mix is listed in the following Table I.

TABLE I

| Cake Mix | Premix Avg. Particle Density | Aeration | Premix Processing Ingredients (Pounds) | | | | Additional Mix Ingredients (Pounds per 70.65 Pounds of Premix) | | | | | | | |
|---|---|---|---|---|---|---|---|---|---|---|---|---|---|---|
| | | | Sucrose | Flour | Emulsified Shortening[1] | Water | Sucrose | Dextrose | Non-Fat Milk Solids | Sodium Acid Pyrophosphate | Sodium Bicarbonate | Sodium Aluminum Phosphate | Color | Salt |
| 1 | 1.301 | Non-aerated | 20.1 | 63.5 | 16.4 | 78.6 | 26.6 | 1.5 | 3.0 | 0.90 | 0.95 | 0.40 | 1.7 | 0.85 |
| 2 | 1.073 | Aerated | 20.1 | 63.5 | 16.4 | 78.6 | 26.6 | 1.5 | 3.0 | 0.90 | 0.95 | 0.40 | 1.7 | 0.85 |
| 3 | 1.335 | Non-aerated | 36.94 | 50.0 | 12.96 | 66.8 | 14.8 | 1.5 | 3.0 | 0.90 | 0.95 | 0.40 | 1.7 | 0.85 |
| 4 | 0.785 | Aerated | 36.94 | 50.0 | 12.96 | 66.8 | 14.8 | 1.5 | 3.0 | 0.90 | 0.95 | 0.40 | 1.7 | 0.85 |

[1] Emulsified hydrogenated lard employed in Example I including the lard and surface active agents.

For comparative purposes, a premix having the identical components was prepared excepting that the premix was not aerated (i.e., the aeration process step was not employed). Cake mixes having the identical additional mix ingredients added thereto were prepared. Cake batters employing the non-aerated and aerated premix were prepared by hand shaking methods.

The hand shaking method was accomplished by placing an admixture of 110 grams of egg and 315 milliliters of water in a polyethylene bag (12 inches by 20 inches). The cake mix (496 grams) was added to the admixture followed by sealing of the polyethylene bag by twisting to entrap air therein. Batter preparation was accomplished by vigorous hand shaking of the ingredients therein for 15 seconds.

The resultant batter from the aerated premix containing cake mix was 32,400 centipoises whereas the non-aerated premix cake mix batter was 23,600 cps. The batters thus prepared were then baked in 2 standard 8-inch in diameter pans for 33 minutes at 350° F. Average volumes for the Several cakes were prepared employing the aforementioned cake mixes of Table I. The amount of grams of cake mix, eggs, water with the batter mixing and baking conditions are set forth in Table II. Results of the baked cakes prepared therefrom are also tabulated in Table II.

TABLE II

| Cake Mix | Batter Preparation | | | | | Baking Conditions | | Volume | Tenderness Score | Aeration |
|---|---|---|---|---|---|---|---|---|---|---|
| | Mix | Eggs | Water (ml.) | Blending (min.) | Beating (min.) | Time (min.) | Temp., °F. | | | |
| 1 | 496 | 110 | 315 | 1 | 2 | 33 | 350 | 87 | 561 | N & A |
| 2 | 496 | 110 | 315 | 1 | 2 | 33 | 350 | 90 | 518 | A |
| 1 | 496 | 110 | 375 | 1 | 1 | 28 | 375 | 65 | 594 | N |
| 2 | 496 | 110 | 375 | 1 | 1 | 28 | 375 | 83 | 426 | A |
| 1 | 496 | 110 | 285 | 1 | 3 | 38 | 325 | 82 | 703 | N |
| 2 | 496 | 110 | 285 | 1 | 3 | 38 | 325 | 90 | 613 | A |
| 3 | 496 | 110 | 315 | 1 | 2 | 33 | 350 | 90 | 663 | N |
| 4 | 496 | 110 | 315 | 1 | 2 | 33 | 350 | 96 | 614 | A |
| 3 | 496 | 110 | 375 | 1 | 1 | 28 | 375 | 65 | 594 | N |
| 4 | 496 | 110 | 375 | 1 | 1 | 28 | 375 | 83 | 426 | A |
| 3 | 496 | 110 | 285 | 1 | 3 | 38 | 325 | 82 | 703 | N |
| 4 | 496 | 110 | 285 | 1 | 3 | 38 | 325 | 90 | 613 | A |

From the results tabulated in Table II, it may be seen that the cake mixes containing the aerated premix particles (in contradistinction to the non-aerated premix particles) provide greater cake mix tolerance. As shown in Table II, the resultant cakes prepared from aerated premix particles are more tender with significantly greater volume being provided thereby.

EXAMPLE III

For comparative purposes, aerated and non-aerated premixes containing different sugar levels were prepared pursuant to Example I with and without the aeration step. The ingredients and amounts thereof are tabulated in Table III.

TABLE III

| Premix | Ingredients (pounds) | | | | | Conditions, Aeration | Premix Properties | | |
|---|---|---|---|---|---|---|---|---|---|
| | Sucrose[1] | Flour[2] | Shortening[3] | Non-fat milk solids | Water | | Avg. particle density | Bulk density, gr./ml. | |
| | | | | | | | | Packed | Loose |
| A | 46.67 | 39 | 12.66 | 1.67 | 62.5 | Non-aerated | 1.31 | 0.59 | 0.43 |
| B | 30.42 | 50.87 | 16.53 | 2.18 | 62.5 | Non-aerated | 1.22 | 0.59 | 0.39 |
| C | 30.42 | 50.87 | 16.53 | 2.18 | 62.5 | Aerated | 0.793 | 0.35 | 0.24 |

[1] Granulated.
[2] Bleached low extraction—70 percent to 80 percent soft wheat flour.
[3] Contained 9 percent cottonseed oil hydrogenated to iodine value 8 and superglycerinated; 3 percent of a mixture of 85 percent soybean oil and 15 percent cottonseed oil hydrogenated to an iodine value 3 and superglycerinated; 5 percent cottonseed oil hydrogenated to an iodine value 8; the balance being soybean oil hydrogenated to an SFI at 70° F. of 30.

The amount of premix that was continuously recovered from the spray dryer for Runs A, B, and C was respectively 1.0 pounds, 39.0 pounds and 42.0 pounds.

To the above premixes A to C there was sufficient additional cake mix ingredients to provide a yellow cake mix of approximately the following formulation:

| Ingredients | Percent by weight |
| --- | --- |
| Sugar | 43.2 |
| Shortening | 13.5 |
| Flour | 36.0 |
| Non-fat milk solids | 4.2 |
| Coloring | 0.1 |
| Salt | 1.02 |
| Sodium bicarbonate | 0.67 |
| Monocalcium phosphate | 0.55 |
| Sodium acid pyrophosphate | 0.55 |
| Flavoring | 0.21 |
| | 100.00 |

Several yellow cake batters were prepared from the above mixes containing premixes A, B and C employing 567 grams of the yellow cake mix, 110 grams of liquid egg and 240 milliliters of water. Batters were prepared from the cake mixes containing premixes A, B and C by blending the cake mix along with the added water and egg for one minute with a standard household mixer and mixing bowl at a low speed for one minute. The resultant batters were then baked in a standard 8-inch in diameter baking pan for 33 minutes at 350° F. Average cake volume for the non-aerated premix A containing cake mix was 92 whereas the aerated premix C provided a cake volume of 99.

Several batters of the mixes containing the non-aerated premix A and B and aerated premix C were prepared by the hand shaking method per Example II. The resultant baked cakes (baked at 350° F. for 33 minutes) prepared therefrom provided the following cake volumes:

| | |
| --- | --- |
| Non-aerated mix A | 89 |
| Non-aerated mix B | 93 |
| Aerated mix C | 97 |

What is claimed is:

1. A dry, aerated premix particulate composition adapted to readily disperse in an aqueous medium, said composition consisting essentially of a multiplicity of particles wherein said particles have an average particle density of less than 1.5 grams per cubic centimeter with each particle having a plurality of gas voids, said particles comprising on a dry weight basis 100 parts by weight flour, sugar in an amount of about 2 to 100 parts by weight and emulsified fat; the amount of flour, sugar and shortening contained within said particles being further characterized as providing an N value of at least 10 as ascertained by the following equation:

$$N=[-0.175F-3.927E+0.344S+0.085FE+0.0162FS+0.0452ES-30]$$

wherein F, E and S are respectively representative of the weight percent of the total dry weight of the flour, emulsified fat and sugar contained in said particles.

2. The particulate composition according to claim 1 wherein the particles contain from about 14 to 100 parts by weight sugar for each 100 parts by weight flour therein.

3. The particulate composition according to claim 2 wherein the amount of emulsified fat ranges from about 8 to about 75 parts by weight.

4. The particulate composition according to claim 3 wherein the particles have an average particle density of less than 1.00 gram per cubic centimeter and the amount of sugar ranges from about 35 to about 70 parts by weight.

5. The particulate composition according to claim 4 wherein N is at least 20.

6. The particulate composition according to claim 5 wherein said particles have an average particle density ranging from about 0.75 to about 1.00, and the sugar and emulsified fat respectively range from about 40 to 50 and from about 20 to about 40.

7. A method for providing an aerated premix particulate composition adapted for use in culinary mixes which comprise the steps of:

(a) mixing 100 parts by weight flour, from about 2 to 100 parts by weight sugar, from 0 to about 75 parts by weight shortening and water in an amount sufficient to provide a visco-elastic mass, said mass being further characterized as providing a Y of at least 10 as ascertained by the following Equation:

$$Y=[0.105FW+0.048SW+.28FE+0.05FS+0.15ES-5.04F-7.14E-1.54S-30]$$

wherein F, W, S and E respectively represent the weight percent of flour, water, sugar and fat, said weight percents being based upon the total weight of the amount of flour, sugar, shortening and water in said visco-elastic mass; and (b) aerating the mass with a non-toxic gas and subsequently drying the aerated mass in a particulate form, said aeration of the visco-elastic mass being sufficient to provide to the dried particulates an average particle density of less than 1.15 grams per cubic centimeter.

8. The method according to claim 7 wherein the visco-elastic mass contains for each 100 parts by weight flour from about 8 to about 75 parts by weight emulsified fat and from about 14 to 100 parts by weight sugar.

9. The method according to claim 8 wherein the aeration of the visco-elastic mass is sufficient to provide to the dried particulates an average particle density of less than 1 gram per cubic centimeter.

10. The method according to claim 9 wherein Y has a value of at least 20.

11. The method according to claim 10 wherein the amount of sugar ranges from about 35 to about 75 parts by weight sucrose for each 100 parts by weight flour.

12. The method according to claim 11 wherein said aeration of the visco-elastic mass is sufficient to provide to the dried particulates an average particle density ranging from about .75 to about 1.00 gram per cubic centimeter.

13. The method according to claim 12 wherein the visco-elastic mass contains from about 40 to about 50 parts by weight sucrose and from about 20 to about 40 parts by weight emulsified shortening.

14. The method according to claim 13 wherein the total amount of solids contained in the visco-elastic mass ranges from about 40 to about 60 weight percent.

15. A dry, free-flowing baking mix adapted to provide a chemically leavened baked product containing 100 parts by weight flour, from about 15 to 250 parts by weight sugar and from about 5 to about 100 parts by weight fat, said baking mix comprising a premix particulate portion and a mix portion, said premix particulate portion consisting essentially of a multiplicity of particles wherein at least a major portion of said particles have a particle density of less than about 1.15 grams per cubic centimeter and the individual particles have a plurality of gas voids, said particles comprising on a flour, sugar and shortening weight basis at least 100 parts by weight flour, sugar in an amount ranging from about 4 to 100 parts by weight and from 0 to about 75 parts by weight emulsified fat, the amount of sugar, flour and shortening contained in said particles being further characterized as sufficient to provide an N value of at least 10 as ascertained by the following equation:

$$N=[-0.175F-3.927E+0.344S+0.084FE+0.016FS+0.045ES-30]$$

wherein F, S and E are respectively representative of the weight percent of sugar, flour and shortening contained in said particles and said mix portion comprising crystalline sucrose in an amount ranging from at least 5 to about 250 parts by weight and edible fat in an amount ranging from 0 to about 50 parts by weight.

16. The cake mix according to claim 15 wherein the premix portion contains from about 14 to 100 parts by weight sugar for each 100 parts by weight flour and the mix portion contains an edible baking mix leavening system in an amount sufficient to release a gas and provide volume to the baked cake prepared from said mix.

17. The cake mix according to claim 16 wherein the amount of emulsified fat provided by the premix portion ranges from about 8 to about 75 parts by weight emulsified fat for each 100 parts by weight flour and the mix portion contains chemical leavening in an amount sufficient to release a gas and provide volume to the baked cake prepared from said mix.

18. The cake mix according to claim 17 wherein the amount of sugar provided in the mix portion ranges from about 30 to 80 parts by weight.

19. The cake mix according to claim 18 wherein the premix particles have an average particle density of less than 1 and the amount of sugar therein ranges from about 35 to about 70 parts by weight.

20. The cake mix according to claim 19 wherein N has a value of at least 20.

21. The cake mix according to claim 20 wherein said particles have an average particle density ranging from about .75 to about 1.00 and the amount of sugar and emulsified fat provided by the premix portion respectively ranges from about 40 to about 50 and from about 20 to about 40.

22. The cake mix according to claim 21 wherein the mix portion contains from about 45 to about 75 parts by weight crystalline sucrose for each 100 parts by weight flour provided by said premix portion.

23. A method of making a cake mix comprising the steps of:
(a) mixing 100 parts by weight flour, from about 2 to 100 parts by weight sugar, from about 8 to about 75 parts by weight emulsified shortening and water in an amount sufficient to provide a visco-elastic mass, said mass being further characterized as providing an N value of at least 10 as ascertained by the following Equation II:

(II) $Y = [0.105FW + 0.048SW + .28FE + 0.05FS + 0.15ES - 5.04F - 7.14E - 1.54S - 30]$ wherein F, W, S and E respectively represent the weight percent of flour, water, sugar and fat, said weight percents being based upon the total weight of the amount of flour sugar, shortening and water in said visco-elastic mass; and, (b) aerating the mass with a non-toxic gas and subsequently drying the aerated mass in a particulate form, said aeration of the visco-elastic mass being sufficient to provide to the dried particulates an average particle density of less than 1.15 grams per cubic centimeter;

(c) dry blending the dried particulates with additional cake mix ingredients not used in forming the dried particulates in a manner such that the average particulate density increase is thereby less than about an A value of:

$$A = (1.20 - X)X$$

wherein X is the average particle density of the particles as provided in step (b), said additional cake mix ingredients (based upon 100 parts by weight flour in said particulates) containing sucrose in an amount ranging from about 30 to about 80 parts by weight sugar.

24. The method according to claim 23 wherein the particulates are spray dried particulates having an average particle density of less than 1.0

25. The method according to claim 24 wherein Y has a value of at least 20.

26. The method according to claim 25 wherein in mixing stage (a) there is employed from about 35 to about 70 parts by weight sucrose.

27. The method according to claim 26 wherein the visco-elastic mass contains from about 20 to about 40 parts by weight emulsified fat and from about 40 to about 50 parts by weight sucrose.

28. The method according to claim 27 wherein from about 45 to about 75 parts by weight crystalline sucrose is dry blended as an additional cake mix ingredient.

References Cited
UNITED STATES PATENTS
| | | | |
|---|---|---|---|
| 3,116,150 | 12/1963 | Baker | 99—94 |
| 3,257,213 | 6/1966 | Colby | 99—94 |

FOREIGN PATENTS
| | | |
|---|---|---|
| 622,017 | 6/1961 | Canada. |

RAYMOND N. JONES, Primary Examiner

U.S. Cl. X.R.

99—94